United States Patent [19]

Borovsky

[11] 4,366,202
[45] Dec. 28, 1982

[54] CERAMIC/ORGANIC WEB

[75] Inventor: Joseph Borovsky, Menasha, Wis.

[73] Assignee: Kimberly-Clark Corporation, Neenah, Wis.

[21] Appl. No.: 275,582

[22] Filed: Jun. 19, 1981

[51] Int. Cl.³ ............................ B32B 5/16; D04H 1/72
[52] U.S. Cl. ...................... 428/283; 264/62;
264/221; 427/412; 427/419.2; 427/419.7;
427/421; 427/427; 428/281; 428/284; 428/286;
428/242; 428/251; 428/244; 428/241; 428/268
[58] Field of Search .............. 428/251, 244, 241, 268,
428/286, 281, 242, 283, 284, 311.5, 312.6, 312.8,
317.9; 264/62, 221; 427/412, 419.2, 419.7, 421,
427, 389.9

[56] References Cited

U.S. PATENT DOCUMENTS

| | | | |
|---|---|---|---|
| 3,111,396 | 11/1963 | Ball | 264/44 |
| 3,253,947 | 5/1966 | McClver | 428/281 |
| 3,440,132 | 4/1969 | Koubek | 428/242 |
| 3,709,721 | 1/1973 | King | 428/242 |
| 3,845,181 | 10/1974 | Ravault | 264/44 |
| 3,962,389 | 6/1976 | Takase | 264/56 |
| 4,075,303 | 2/1978 | Yarwood | 264/44 |
| 4,282,284 | 8/1981 | George | 428/251 |
| 4,313,900 | 2/1982 | Gonzales | 428/242 |

FOREIGN PATENT DOCUMENTS 54-158486 12/1979 Japan ............................ 428/242

*Primary Examiner*—Ellis P. Robinson
*Attorney, Agent, or Firm*—Wendell K. Fredericks; William D. Herrick

[57] ABSTRACT

Flexible ceramic/organic webs are prepared by coating, using fixed nip techniques, a highly viscous, thixotropic material over at least two sides of an organic, thermoplastic substrate. The substrate, having fibers randomly arranged, highly dispersed and bonded at the filament junction, is the type which disintegrates at highly elevated temperatures. The resulting material is highly loaded with ceramic particles such that greater than 70 percent of the total weight of said web is ceramic material. Webs prepared in accordance with the present invention can be shaped into a variety of desired configurations and then fired at highly elevated temperatures causing the substrate to disintegrate, to thereby form ceramic articles having very high ceramic bonding properties.

12 Claims, 4 Drawing Figures

CERAMIC/ORGANIC WEB

BACKGROUND OF THE INVENTION

1. Field of the Invention

This invention relates generally to greensheet articles and more particularly, in a preferred embodiment, to a flexible ceramic/organic web and methods for forming such a web that is capable of being fused at elevated temperatures and converted to ceramic articles of a variety of configurations.

2. Description of the Prior Art

In prior art flexible ceramic/organic web articles, it is well known to use open-celled organic sponges or foams as carriers of refractory ceramic particles impregnated thereon. Various admixtures of ceramic particles and impregnating techniques have been employed to produce ceramic/organic webs which are particularly useful for making fused ceramic structures or sintered parts some of which having relatively complex shapes which retain their structural integrity over wide temperature ranges. The major difficulty encountered by the use of these prior art methods have been loading sufficient quantities of ceramic slurry in a structure suitable for providing a product which is a strongly bonded material after sintering.

One method for forming ceramic articles is described in U.S. Pat. No. 4,075,303 issued Feb. 21, 1978 to Yarwood et al. There, a process for producing a ceramic article comprises providing an open celled organic polymer foam material web possessing a predetermined permeability and resilience, and impregnating the web with a fluid aqueous slurry of a thixotropic ceramic composition; then passing the impregnated foam material through a pair of rollers of a particular nip, the pair of rollers and the nip being preset to effect temporary successive compressions, amounting to about 50 to 90% of the thickness of said material for a first pass and 70 to 90% of the thickness for the second pass. Following the combined impregnation and compression steps, the resulting uniformly impregnated foam material is heated to remove moisture and then to volatilize the foam web component. The resulting article is then ready for use preferably as a filter for molten metals or optionally to be formed into ceramic articles by further heating to sinter the ceramic material.

This method of forming articles, however, is primarily for forming a permeable structure suitable for filtering molten metals. This technique appears to be an inefficient method for providing sinter ceramic articles because excessive amounts of work would be required to effectively load the open-celled foam structure to the degree of compactness required to permit forming sintered articles that exhibit low surface flaws and high structural uniformity over wide ranges of temperatures.

Another method for loading a foam web with ceramic material is described in U.S. Pat. No. 3,845,181 dated Oct. 29, 1974 issued to Ravault et al. There, the problems associated with loading foam with a slurry of finely divided ceramic particles are addressed. It is recognized that the strength of porous ceramic materials so manufactured is often not very great. This is believed to stem from the fact that during firing, the original organic foam structure burns out to leave thin, very fragile, webs of ceramic material webs. In the case of a reticular organic foam, ceramic tubes will be formed; in the case of a foam with cell walls, fragile ceramic part spheres which are very weakly bonded will occur. In either case, the structure is not adapted to withstand loading. Hence to solve the loading problem using foam and the slurry of finely divided ceramic particles, certain additives are added to the foam and/or the slurry prior to or during impregnation which are capable of attacking the foam and disintegrating it. After impregnation with the ceramic slurry and during drying of the materials and when the temperature is increased, the concentration of the attacking agent rises as a consequence of the evaporation of the slurry; the foam is attacked rapidly, and the dried (but unfired) structure tends to become a coherent foam-structured mix of finely divided particulate ceramic material and organic foam breakdown by-products, rather than a foam coated with a layer of particulate ceramic. Hence, on firing, a solid but more coherent overall structure is formed.

It should be recognized that foams and sponges present inherent disadvantages as a medium for high level loading of organic filler materials. Also, the procedural steps required to load filler materials in open-cell structure foam are not easily adaptable to continuous or semi-continuous mass production techniques because of the ease by which foam and sponge materials may be compressed and deformed.

A further prior art method for storing refractory materials on a carrier which employs, in addition to foam, a mesh or a cloth as the carrier of the refractory pigment is described in U.S. Pat. No. 3,111,396 dated Nov. 19, 1963 to B. B. Ball. There, a slurry is made of a liquid such as an organic solvent or water and a finely divided powder such as metal, metal oxide, or other metal compounds. The slurry can include an organic binder such as a synthetic resin. The selected organic structure is then saturated with the slurry as thoroughly as possible. Any excess slurry is removed from the pores or open portions of the structure by squeezing, leaving only the matrix of the organic structure impregnated with the slurry. Then the coated web is slowly dried at or near room temperature e.g., for about 18 hours to assure slow liquid removal in order to keep the powder of the slurry in place. Such a web coating procedure appears to be a very slow process and is not very well suited for mass production techniques for making greensheets.

Another method for forming a particle sheet material is described in U.S. Pat. No. 3,962,389 dated June 8, 1976 to Takase et al. Takase et al teaches forming a ceramic greensheet material which does not contain organic binders such as elastomers and latex, fixatives and polymeric coagulating agents. Their method is one for producing particle sheet material which is shapable and contains large amounts of inorganic fine particles, wherein the method steps comprises graft copolymerizing cationic monomer to cellulose pulp to obtain cationic pulp causing the cationic pulp to adsorb and coagulate the inorganic particles which has a negative interfacial electrokinetic potential in water, and then forming the particle sheet material therefrom by using a sheet forming machine. Although this method of Takase et al seems to be a very highly efficient method for loading particles in a sheet structure it does not appear to be an effective method for mass producing greensheets since the abrasive nature of particles would probably destroy vital components of the sheet forming equipment after a short period of time.

The present invention is directed to the improved techniques and methods for forming a ceramic/inorganic web the product which resulted from confronting and solving the basic material storing problems as described above. In the course of the development additional unforeseen problems were resolved as will be apparent.

BRIEF SUMMARY OF THE INVENTION

The present invention is directed to a flexible ceramic/organic web for use in the manufacture of ceramic articles of a variety of configurations. In addition to being a flexible web, the present ceramic/organic web contains high levels of thixotropic materials which provide a composite web structure having very high ceramic bonding strength properties that permit heat fired structural figures to be formed therefrom possessing unusual structural uniformity.

The ceramic/organic web includes a flexible fibrous substrate of woven or nonwoven material and a coating of thixotropic ceramic composition disposed over and within the open pores of the substrate. The pores of the substrate, which are large and which are significantly void of foreign solid material, provide the receptacles for large quantities of the ceramic materials.

In the preferred embodiment of the web an organic, nonwoven/ceramic web is provided by loading the organic material substrate with a suitable coating composition in a specific manner. This coating composition includes an admixture of a highly refractory material, an organic binder and a spreading or wetting agent. One such high ceramic refractory material is silicon carbide. A suitable polymeric binder is polyvinyl alcohol. The wetting agent may be a large number of nonionic water-soluble surfactants possessing wetting and emulsifying properties.

This coating composition is a substantially highly viscous slurry which enters and deposits on and between the fibers of the fiberous substrate when suitable coating equipment is used that is capable of providing a sufficient rate of shear force upon the material; also the composition has that thixotropic ability to become sufficiently viscous to resist running out or draining from around the fibers of the substrate as the web is air dried during the coating operation.

When the thus coated web is formed into a desired configuration for the purpose of forming a ceramic article, the coating has suitable shear strength to withstand reasonable folds and bends without any deleterious effect to the web. The web in the configured form can be fused or sintered at elevated temperatures and converted to the desired ceramic article; the sintering causing the nonwoven web to disintegrate. At the elevated temperature the ceramic particles are fused forming a homogeneous ceramic structure having very high ceramic bonding properties.

DETAILED DESCRIPTION

Figure 1:
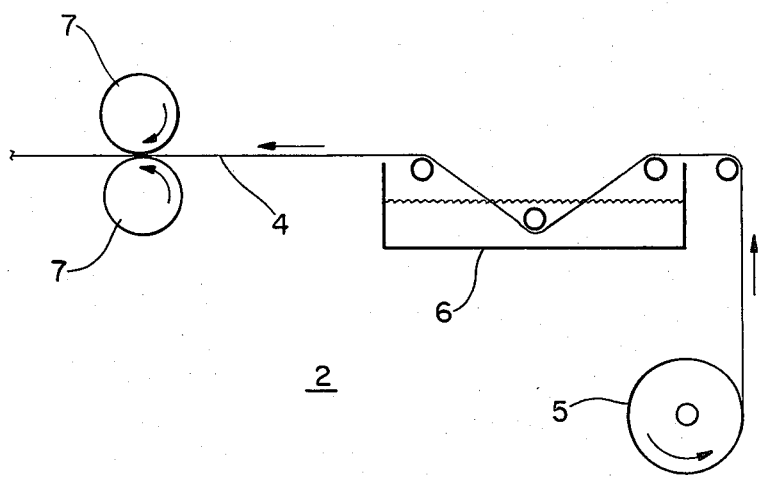
FIG. 1 is a basic saturating apparatus for impregnating flexible substrate that includes a pair of squeeze rollers.

Referring to the drawing figures, there is shown in FIG. 1 a basic prior art saturation apparatus 2 for impregnating a flexible web 4 with a ceramic particle slurry that includes a pair of squeeze rollers 7—7. A saturation means 6 that is used to apply the slurry of ceramic particles onto a moving, flexible web in a manner that causes the particles to be impregnated thoroughly into the web structure. The squeeze rollers 7—7 are used to remove excess slurry from the pores or open regions of the web so as to leave only the matrix of the web structure impregnated with the slurry. The thus coated web is carefully collected and then dried at room temperature to prevent loss of particle content due to excessive handling.

Figure 2:
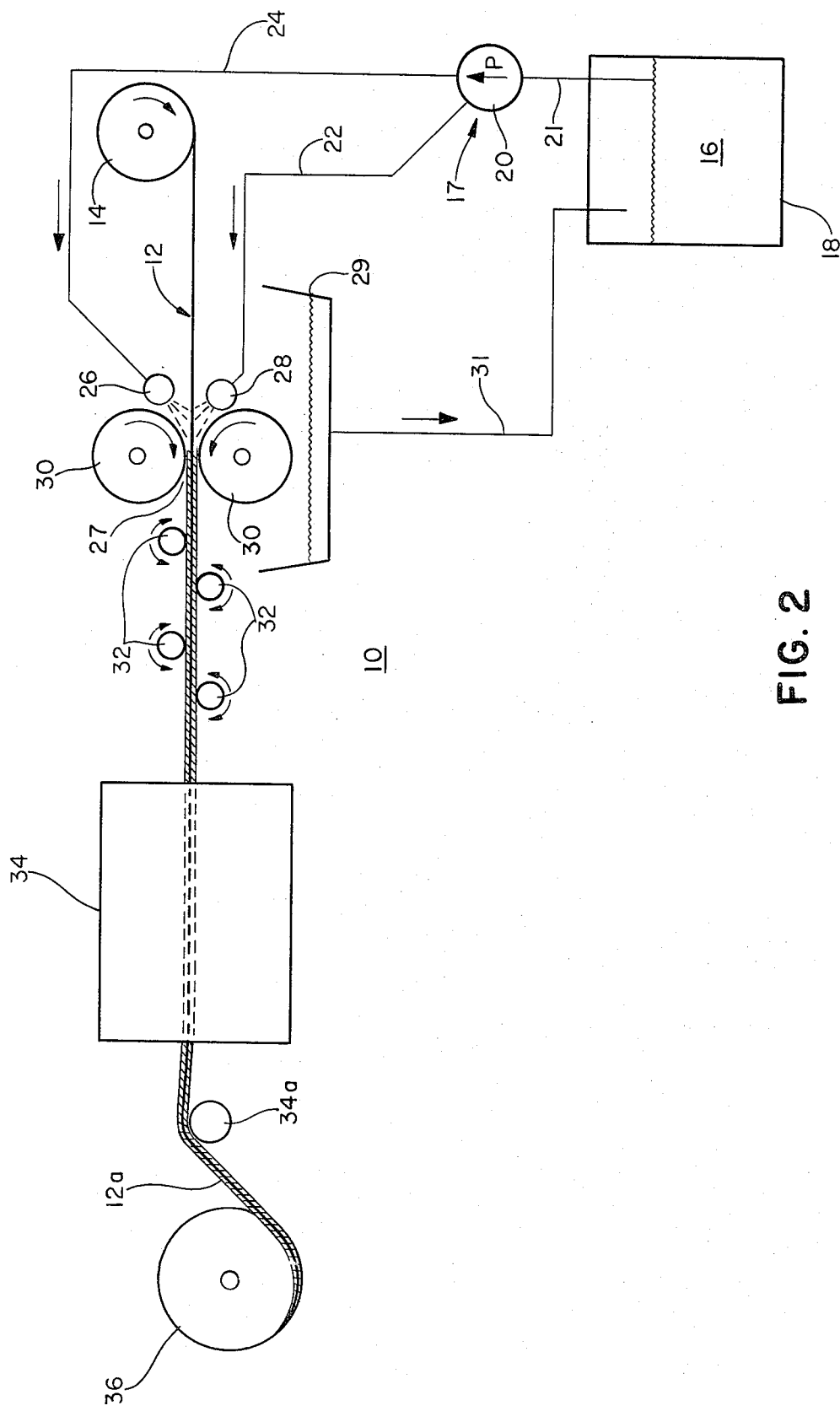
FIG. 2 is a block diagram representation of the coating apparatus of the present invention.

To provide a high volume of ceramic particles over a substrate, a preferred embodiment of a ceramic particle loading apparatus is depicted in FIG. 2. Illustratively, substrate 12 is a thin open-structured sheet product. In the preferred embodiment, substrate 12 is a spunbonded polyester sheet product comprised of continuous-filament polyester fibers that are randomly arranged, highly dispersed and bonded at the filament junctions.

The particle slurry may be a composition which permits forming a greensheet to be fired in either an oxidized or in an inert atmosphere. If an oxidized environment is to be used then the slurry should be comprised of 1000 gms of 10% of polyvinyl alcohol (PVA) resin; 900 gms of silicon carbide (400 or 600 mesh); and 10 gms of 25% wetting agent.

If an inert environment is to be used when firing the greensheet, then the slurry should comprise of 483.9 gms of 62% butyl latex, 900 gms of silicon carbide and as much of a thickener as needed to adjust the slurry to 10,000 cps.

The preferred polyester substrate is a thermoplastic material sold under the registered trademark REEMAY by E. I. du Pont de Nemours & Co. (Inc.) of Wilmington, Del.

The preferred PVA is a 90,000 to 100,000 molecular weight of fully hydrolyze resin sold under the trade designation ELVANOL (71-30) by E. I. duPont de Nemours & Co. (Inc.) of Wilmington, Del. The silicon carbide (SIC) filler is a crystalline material sold under the registered trade designation carborundum by Carborundum Co. of Niagara Falls, N.Y. The wetting agent is a nonionic surfactant sold under the trade designation IGEPAL Co. (610) by Antara Chemicals of New York, N.Y. The butyl latex binder is one sold under the trade designation EMD603A by Burke-Palmason Chemical Company of Pompano Beach, Fla. The preferred thickner is one sold under the trade designation Paragum 131 by Para-chem, Inc. of Philadelphia.

This above described particle coated web 12a can be comprised of inorganic refractory particles of amounts totaling greater than 70% of the total web weight.

In addition to the embodiment described above, other materials suitable for use as substrate 12 can be open structured, organic or inorganic, woven or nonwoven material e.g. asbestos cloth, glass web, nonwoven polyester and nonwoven nylon. Substrate 12 may have a thickness of from about 5 to 20 mils and a basis weight in the range of about 25 to 200 g/m$^2$. The fillers can along with other forms of silicon carbide, be ceramic powder, iron oxide or aluminum powder, the particle size may vary from 100–800 mesh.

Alternate binders may be used for both the oxidizing or inert atmosphere environment as long as good adhesion with the filler is maintained at high filler-to-binder ratios. Filler-to-binder ratios may be as high as 15:1.

The viscosity of the slurry 16 should be maintained between 8,000–20,000 cps (Brookfield #4 spindle) to insure a smooth coating application. Aqueous or solvent systems may be used, but, aqueous systems are preferred.

Referring now to FIG. 2, there is illustrated in block diagram form, an improved coating apparatus 10. Supply wheel 14 is used to store and to supply portions of substrate 12 for coating. Takeup roller 36 is used to collect a coated web 12a. A slurry transfer system 17 is used to transfer the slurry 16 from a storage reservoir 18 through an outlet transfer conduit 21 to a distribution pump 20. Pump 20 is an adjustable pump which is capable of being adjusted to permit transfer of various ranges of viscosity of the ceramic slurry. A first slurry shower 26, connected to pump 20 through a first transfer conduit 24, is mounted to a frame (not shown) at a location such as to permit flooding the top surface of substrate 12 with the highly viscous slurry 16. Similarly, a second slurry shower 28, connected to pump 20 through a second transfer conduit 22, is mounted to a frame (not shown) at a location such as to permit flooding the bottom surface of substrate 12 with the slurry. A pair of nip rollers 30—30 are rotatably mounted downstream from the showers 26 and 28 in a manner so as to form a fixed nip 27 of a chosen gap dimension. For forming the preferred ceramic/organic sheet the gap is set at 20 mils. Rollers 30—30 may be spatially adjusted so as to vary the gap of nip 27 in accordance with the desired thickness of the slurry covering substrate 12. A collection pan 29 is disposed below the showers 26 and 28 and the rollers 30—30 so as to collect drippings of excess slurry from a coated web 12a. A return transfer conduit 31 is connected between pan 29 and reservoir 18 to permit returning the excess slurry to the reservoir for future use.

A plurality of rotatable burnishing wheels 32—32 are mounted on a frame (not shown) downstream from the nip rollers 30—30. The burnishing wheels 32—32 are disposed so as to permit smoothing out any blemishes which may occur in the coated web 12a. Rotating means (not shown) are used to rotate the burnishing wheels either in the direction or against the direction of web travel in a manner that accomplishes effective smoothing of the particle coating. In this preferred embodiment the nip rollers 30—30 are teflon coated to protect the rollers from the abrasive particles in the slurry. The burnishing wheels 32—32 are made of steel of a strength which can sustain the abrasiveness of the slurry particles.

An air-flow heater 34 is used to dry the moving coated web 12a as the web is passed unsupported through the heater.

The operation of coating apparatus 10 will now be discussed. The substrate 12 is initially threaded by hand from supply wheel 14 passed the showers 26 and 28, through the nip rollers 30—30 and the burnishing wheels 32—32 then over the mounting post 34a near heater 34 so as to suspend the web in space and then to the take-up reel 36.

Prior to activating the drive motor system (not shown) for take-up reel 36, the nip 27 between the nip rollers 30—30 are adjusted illustratively to 20 mils the desired thickness of the finished sheet. The burnishing rollers 32—32 are correspondingly adjusted to be coincident with the gap established with the nip rollers 32—32. Pump 20, an adjustable, through-put pump is adjusted to permit transfer of the slurry 16 in accordance with the viscosity of the slurry which can range from 8,000–20,000 cps.

The temperature of heater 34 is adjusted to provide drying air at a temperature of illustratively 140° C. for drying the coated web 12a as web 12a passes through heater 34.

The slurry mixture is formed in a conventional manner and then deposited in reservoir 18.

Immediately upon filling reservoir 18, the drive motors for take-up reel 36 and pump 20 are activated initiating the web coating process at a rate illustratively of 100 ft/min.; but, however, the coating rate can be varied from 40 to 300 ft./min. depending upon the oven efficiency to drag the heavy coating.

Figure 3:
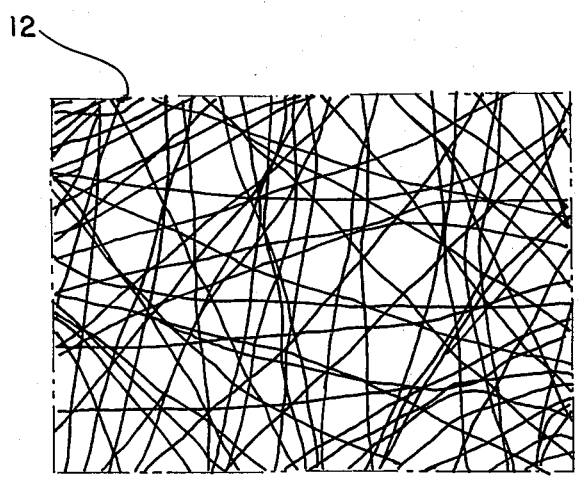
FIG. 3 is a microscopic illustration of a portion of the carrier substrate of this invention.

Showers 26 and 28 spray slurry 16 on the top surface and the bottom surface of web 12a respectively. The slurry is transferred through conduit 21 from reservoir 18 by pump 20 through conduits 22 and 24 to showers 26 and 28 respectively. The top coat and bottom coat, in addition to coating the fibers of substrate 12, are linked together through the open regions of the substrate. See FIG. 3 which shows a 50× magnified portion of substrate 12; the open-structure of the substrate can readily be discerned.

Figure 4:
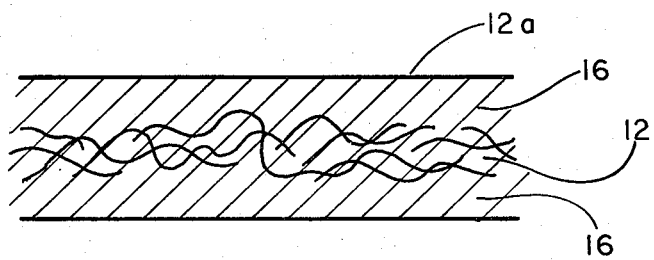
FIG. 4 is a microscopic illustration of an edge-view of a portion of the coated web of this invention.

The fixed nip 27 formed by nip rollers 30—30 and the burnishing rollers 32—32 are used to smooth out the coating composition prior to passing the coated web 12a through heater 34. In heater 34, web 12a is suspended substantially in the air chamber of heater 34 and hot air is blown on the coated web on all sides to dry web 12a as the web is moved through heater 34. The thus coated web has a structural configuration as illustrated in FIG. 4 which depicts a 50× magnified edge view of coated web 12a.

The preferred embodiment of the coated web 12a is a ceramic/organic web comprised of a thermoplastic skeletal substrate coated with a thixotropic material containing high levels of refractory particles capable of withstanding high temperatures. Such a coated web can be formed into a variety of desired configurations for the purpose of forming ceramic articles. The thixotropic material has sufficient shearing strength to withstand reasonable folding and bending without deleterious effect upon the formation of desired shapes. The web in a configured form can thereafter be fired or sintered at elevated temperatures illustratively 2000° C. and converted to the desired ceramic article. During the sintering the thermoplastic skeletal substrate is disintegrated and the remaining ceramic particles in the thixotropic coating are joined forming a homogeneous ceramic article having very high ceramic bonding properties and a minimal amount of void areas.

It is to be understood that the above-described embodiments are mainly illustrative of the principles of the invention. One skilled in the art may make changes and modifications to the embodiment disclosed herein and may devise other embodiments without departing from the scope and the essential characteristics thereof.

I claim:

1. An improved organic/ceramic web having high levels of ceramic particles, capable of being shaped and then fired at elevated temperatures in desired atmospheric environments to form high strength ceramic articles, said web includes a thermoplastic flexible and fibrous substrate having fibers randomly arranged, highly dispersed and bonded at the filament junctions, said improvement comprising:
  a. a first ceramic particle coating covering a top surface of said substrate; and
  b. a second ceramic particle coating covering a bottom surface of said substrate, said first and second coatings comprised of an adhesive binder, ceramic fillers, and a wetting agent in an aqueous system, said binder being the type which provides substantially high levels of adhesion with said fillers having a high filler-to-binder ratio admixture of about 15 to 1, said binder also providing cohesion of said first coating to said second coating around as well as between the randomly arranged and highly dispersed fibers of said substrate, said adhered coatings providing a thixotropic material having a high content of ceramic particles covering said thermoplastic substrate providing a web that is shapable to a desired structural configuration, during use, said substrate being the type which will rapidly disintegrate at highly elevated temperatures leaving said thixotropic material disposed in said desired structural configuration, to thereby provide a shaped ceramic article with strong ceramic bonding between said ceramic particles.

2. A web in accordance with claim 1 wherein said fillers are powders or fibers and selected from the group consisting of silicon carbide, ceramic powder, iron oxide and aluminum oxide.

3. A web in accordance with claim 2 wherein said binder is a polyvinyl alcohol resin having a molecular weight of from 90,000 to 100,000, said polyvinyl alcohol resin being employed as the binder when it is desired to sinter the shaped web in an oxidized atmospheric environment.

4. A web in accordance with claim 2 wherein said binder is butyl latex, said butyl latex being employed as a binder when it is desired to sinter the shaped web in an inert atmospheric environment.

5. A web in accordance with claim 3 including wetting agent of a non-ionic surfactant.

6. A web in accordance with claim 4 including a thickener suitable for adjusting the composition to a desired viscosity.

7. A web in accordance with claim 5 or 6 wherein said viscosity of said composition is maintained between 8,000 and 20,000 centipoise.

8. A method of forming a ceramic/organic web possessing a high content of ceramic particles comprising the steps of:
  a. providing a thermoplastic, flexible, fibrous substrate having fibers randomly arranged, highly dispersed and bonded filament junctions;
  b. preparing an aqueous slurry of a thixotropic ceramic admixture having a viscosity within the range of 8,000 to 20,000 cps said slurry being comprised of a wetting agent, an adhesive binder and ceramic fillers, said slurry having a filler-to-binder ratio of at least 15 to 1;
  c. providing at least two showers to flood a top and a bottom surface of said substrate with said slurry;
  d. providing a pair of nip rollers downstream from said showers disposed to provide a nip of a desired gap at a spacing equal to the thickness of a first coating and a second coating covering the top and bottom surfaces respectively of said substrate;
  e. providing a plurality of burnishing wheels downstream from said showers disposed to provide substantially smooth surfaces of both the first and second coatings;
  f. passing said substrate past said showers to cover the top and bottom surfaces of said substrate with said slurry;
  g. passing said substrate with said slurry covering the top and bottom surfaces through said nip rollers, said nip providing a shear force upon said slurry so as to fill in and coat said slurry around and between the fibers of said substrate, said slurry being sufficiently viscous to resist running off or draining from the fibers of said substrate;
  h. drying said coated substrate to remove the aqueous content of said coating to form said ceramic/organic web.

9. The method of claim 8 wherein said web has a thickness of from about 5 to 20 mils.

10. The method of claim 8 wherein said aqueous slurry consists of a binder suitable for sintering said web in an oxidizing atmospheric environment, ceramic particle fillers and a wetting agent.

11. The method of claim 8 wherein said aqueous slurry consists of a binder suitable for sintering said web in an inert atmospheric environment, ceramic particles and a thickener.

12. The method of claim 10 or 11 wherein said ceramic particles amount to at least 70% of the total web weight.

* * * * *